(12) United States Patent
Yu et al.

(10) Patent No.: US 8,139,486 B1
(45) Date of Patent: Mar. 20, 2012

(54) METHOD AND SYSTEM FOR GENERATING DATA FRAMES FOR ASYNCHRONOUS OVER TCP/IP PROTOCOL

(75) Inventors: Ken Yu, Burlington, MA (US); Shang Chang, Medford, MA (US)

(73) Assignee: Avaya Inc., Basking Ridge, NJ (US)

( * ) Notice: Subject to any disclaimer, the term of this patent is extended or adjusted under 35 U.S.C. 154(b) by 856 days.

(21) Appl. No.: 11/179,298

(22) Filed: Jul. 12, 2005

(51) Int. Cl.
*H04L 5/22* (2006.01)
(52) U.S. Cl. .................. 370/235; 370/401; 370/474
(58) Field of Classification Search .................. 370/298, 370/299, 300, 310, 389, 394, 395.52, 235, 370/401, 474, 476; 11/298, 299, 300, 310, 11/389, 394, 395.52
See application file for complete search history.

(56) References Cited

U.S. PATENT DOCUMENTS

| | | | | |
|---|---|---|---|---|
| 4,949,333 A * | 8/1990 | Gulick et al. | ................. | 370/282 |
| 5,239,544 A * | 8/1993 | Balzano et al. | ............... | 370/465 |
| 5,384,770 A * | 1/1995 | Mays et al. | ................... | 370/300 |
| 6,266,540 B1 * | 7/2001 | Edgar et al. | ................... | 455/557 |
| 6,292,496 B1 * | 9/2001 | Rasanen | ....................... | 370/503 |
| 2003/0103515 A1 * | 6/2003 | Brown et al. | ................. | 370/412 |

* cited by examiner

*Primary Examiner* — Seema S Rao
*Assistant Examiner* — Mon Cheri Davenport
(74) *Attorney, Agent, or Firm* — Chapin IP Law, LLC

(57) ABSTRACT

Described are a method and system for generating an asynchronous data frame. A character received from an asynchronous device is buffered. Each additional character from the asynchronous device is buffered if the additional character is received before the expiration of a predetermined interval measured from a time when a last buffered character was received. The one or more buffered characters are assembled as a data frame after the expiration of the predetermined interval if no additional character is received from the asynchronous device before the expiration of the predetermined interval. An encapsulated TCP packet that includes the data frame is generated for transmission across a TCP/IP network to a remote device.

10 Claims, 3 Drawing Sheets

METHOD AND SYSTEM FOR GENERATING DATA FRAMES FOR ASYNCHRONOUS OVER TCP/IP PROTOCOL

FIELD OF THE INVENTION

The invention relates generally to asynchronous data communications. More particularly, the invention relates to a method for generating a data frame for transport of asynchronous data over a TCP/IP network.

BACKGROUND OF THE INVENTION

Various types of electronic systems generate asynchronous data for transmission to remote systems or devices. The asynchronous data can be sent to or from a remote system using an "asynchronous data over transmission control protocol/internet protocol (TCP/IP)" (AOT). The AOT protocol enables transport of asynchronous data packets over a TCP/IP network.

The AOT protocol is used in a variety of applications, including security monitoring and alarm systems used by banks, refrigeration control systems and railroad signal monitoring systems. Such systems are typically connected through serial ports to network routers. In one example, a host sends a command to an asynchronous system or device such as a signal panel over a TCP/IP network and the signal panel responds by transmitting asynchronous data. Data from such systems is usually generated only sporadically. Consequently, the asynchronous data do not require significant transmission bandwidth. Moreover, the quantities of asynchronous data generated by such systems are typically small, i.e., the asynchronous data may include only a limited number of characters.

Unlike synchronous transmission (e.g., high-level data link control (HDLC) protocol), the asynchronous data are transmitted without the use of clocking signals and without frame delimiters. Instead, the asynchronous data use start and stop bits to control data transmission. As a result, recognition of the end of an asynchronous data group, or frame, cannot easily be determined.

The asynchronous data are transmitted to one or more remote systems through the Internet or other network using a TCP/IP protocol. According to one technique, an asynchronous line buffer at the asynchronous device is periodically polled for available characters. If no character is provided between characters and after a predetermined number of polling attempts, a frame is declared and a software function is executed to process the most recently received data as a data frame. Unfortunately, the periodic polling consumes processing cycles. Moreover, the polling process can be preempted by other system tasks and can cause improper frame separation or frame combination.

What is needed is a method for the transport of asynchronous data over a TCP/IP network that does not consume significant processing cycles. The present invention satisfies this need and provides additional advantages.

SUMMARY OF THE INVENTION

In one aspect, the invention features a method for generating an asynchronous data frame. A character received from an asynchronous device is buffered. Each additional character is buffered if the additional character is received from the asynchronous device before the expiration of a predetermined interval. The predetermined time interval is measured from a time when a last buffered character was received. The buffered characters are assembled as a data frame after the expiration of the predetermined interval if no additional character is received from the asynchronous device before the expiration of the predetermined interval. In a further embodiment, an encapsulated TCP packet comprising the data frame is generated.

In another aspect, the invention features a system for generating an asynchronous data frame. The system includes a device driver interrupt module, a watchdog timer, a buffer and a frame assembly module. The device driver interrupt module indicates receipt of a character from an asynchronous device. The watchdog timer is configured to generate an indication at the expiration of a predetermined interval and is reset when the device driver interrupt module indicates that a character is received. The buffer stores a plurality of received characters. The frame assembly module generates a data frame comprising the received characters stored in the buffer when the watchdog timer indicates expiration of the predetermined interval.

In yet another aspect, the invention features a system for generating an asynchronous data frame. The system includes means for buffering a character received from an asynchronous device and means, for each of at least one additional character, for buffering the additional character if the additional character is received from the asynchronous device before the expiration of a predetermined interval. The predetermined interval is measured from a time when a last buffered character was received. The system also includes means for assembling the one or more buffered characters as a data frame after the expiration of the predetermined interval if no additional character is received from the asynchronous device before the expiration of the predetermined interval. In one embodiment, the system also includes means for generating an encapsulated TCP packet comprising the data frame.

BRIEF DESCRIPTION OF THE DRAWINGS

The above and further advantages of this invention may be better understood by referring to the following description in conjunction with the accompanying drawings, in which like numerals indicate like structural elements and features in the various figures. For clarity, not every element may be labeled in every figure. The drawings are not necessarily to scale, emphasis instead being placed upon illustrating the principles of the invention.

DETAILED DESCRIPTION

In brief overview, the invention relates to a method for encapsulating asynchronous data for transmission across a transmission control protocol/internet protocol (TCP/IP) network. Characters received from an asynchronous device are buffered. A watchdog timer is reset upon receipt of each character. As long as the idle time between consecutive received characters is less than a predetermined interval as determined by the watchdog timer, the received characters remain in the buffer and new characters continue to be buffered. However, when the watchdog timer expires because the time since the last received character exceeds the predetermined interval; the buffered characters are assembled in a data frame. The frame is passed to a TCP task for transport as a TCP packet to a remote device or system.

Figure 1:
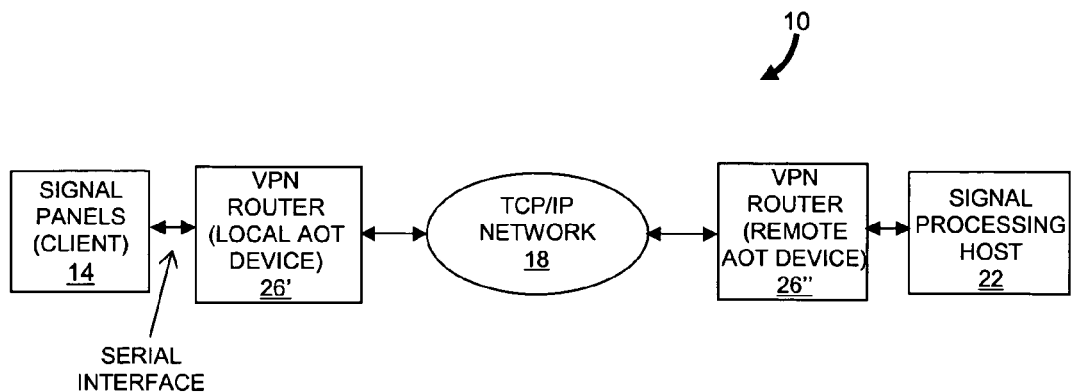
FIG. 1 is a block diagram of a networked environment in which an embodiment of a method for encapsulating asynchronous data for transmission across a TCP/IP network in accordance with the invention can be practiced.

Referring to FIG. 1, a networked environment 10 is shown in which a client 14 sends asynchronous data over a TCP/IP network 18 to a host 22 using an asynchronous traffic over TCP/IP (AOT) protocol in accordance with an embodiment of the invention. A local AOT device 26' maintains an asynchronous link over a serial interface with the client 14 and a remote AOT device 26" maintains a communication link with the host 22. In the illustrated embodiment the client 14 includes one or more signal panels, the host 22 processes asynchronous signal data generated by the client 14 and the local and remote AOT devices 26' and 26" are implemented in local and remote virtual private network (VPN) routers, respectively.

The local AOT device 26' is configured in initiator mode to enable it to originate the TCP/IP connection with the remote AOT device 26". The remote AOT device 26" is configured in listener mode to enable it to receive the client data. Once the TCP connection is established, the connection is maintained by the keepalive socket option. The host 22 is not required to maintain the connection. In the event that the TCP connection is lost, the local AOT device 26' initiates a new TCP connection and the remote AOT device 26" accepts the new connection.

During normal operation, the client 14 transmits asynchronous data intended for the host 22. The local AOT device 26' receives the asynchronous data, determines when a complete frame has occurred, encapsulates the data as a TCP packet and sends the packet over the TCP/IP network 18 to the host 22. The remote AOT device 26" receives the TCP packet intended for the host 22, removes the header information and sends the data to the host 22.

In one embodiment, the host 22 is an asynchronous device and the commands are transmitted through a serial interface from the host 22 to the remote AOT device 26". In another embodiment, the host 22 sends commands to the client 14 to trigger the transmission of asynchronous data by the client 14. In another embodiment, the AOT modes of the AOT devices 26 can be reversed by operator selection using a graphical user interface (GUI) or a command line interface (CLI). Thus the remote AOT device 26" can be changed from initiator mode to listener mode and the local AOT device 26' can be changed from listener mode to initiator mode.

Figure 2:
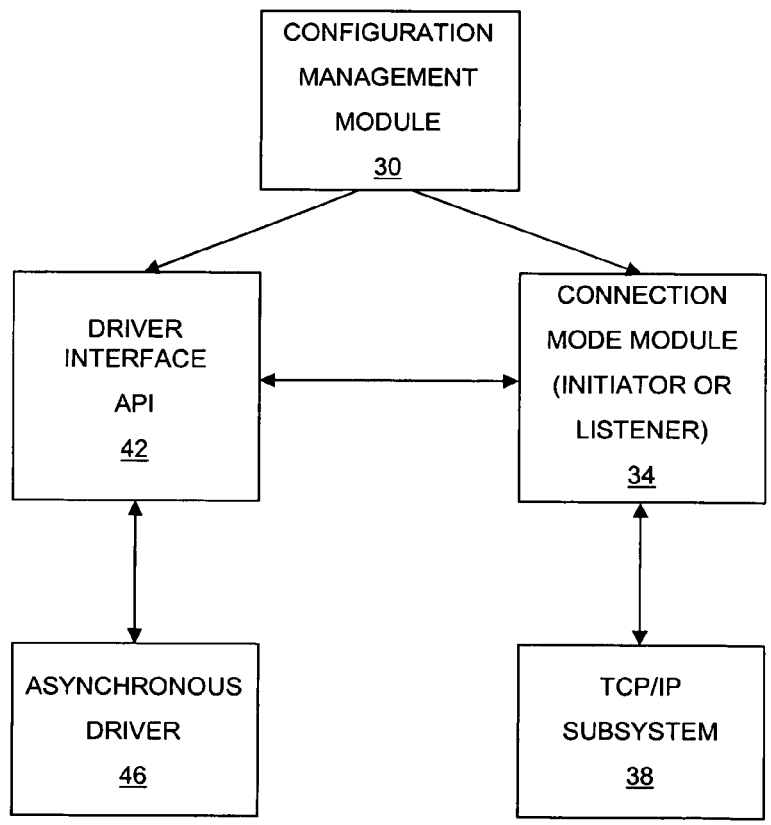
FIG. 2 depicts functional components in the local AOT device of FIG. 1.

FIG. 2 shows the relationship among functional components of the local AOT device (VPN router) 26' of FIG. 1. The components include a configuration management module 30, connection mode module 34, TCP/IP subsystem 38, driver interface application program interface (API) 42 and asynchronous driver 46. The configuration management module 30 enables configuration of the connection mode module 34 in either the initiator mode or listener mode described above and enables configuration of the driver interface API 42 according to the requirements of the client 14. In one embodiment, the configuration management module 30 includes a GUI or CLI to allow a user to specify various configuration parameters for the local AOT device 26' such as the IP address and port number of the remote AOT device 26" and the baud rate for the serial interface.

Figure 3:
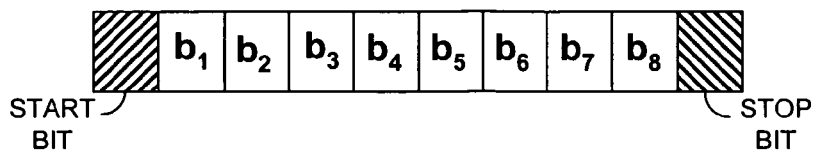
FIG. 3 is a block diagram showing an example of a data format for the data provided by an asynchronous device.

FIG. 3 depicts the general form of asynchronous data generated by the client 14. The data are generally in the form of 10-bit characters comprising a start bit, eight data bits (designated $b_1$ to $b_8$) and a stop bit. A complete transmission of asynchronous data (i.e., a frame) typically includes multiple 10-bit characters; however, because the data is asynchronous, there is no natural termination to the complete set of characters. More specifically, there is no frame delimiter or other indication to signal the end of a data frame.

Figure 4:
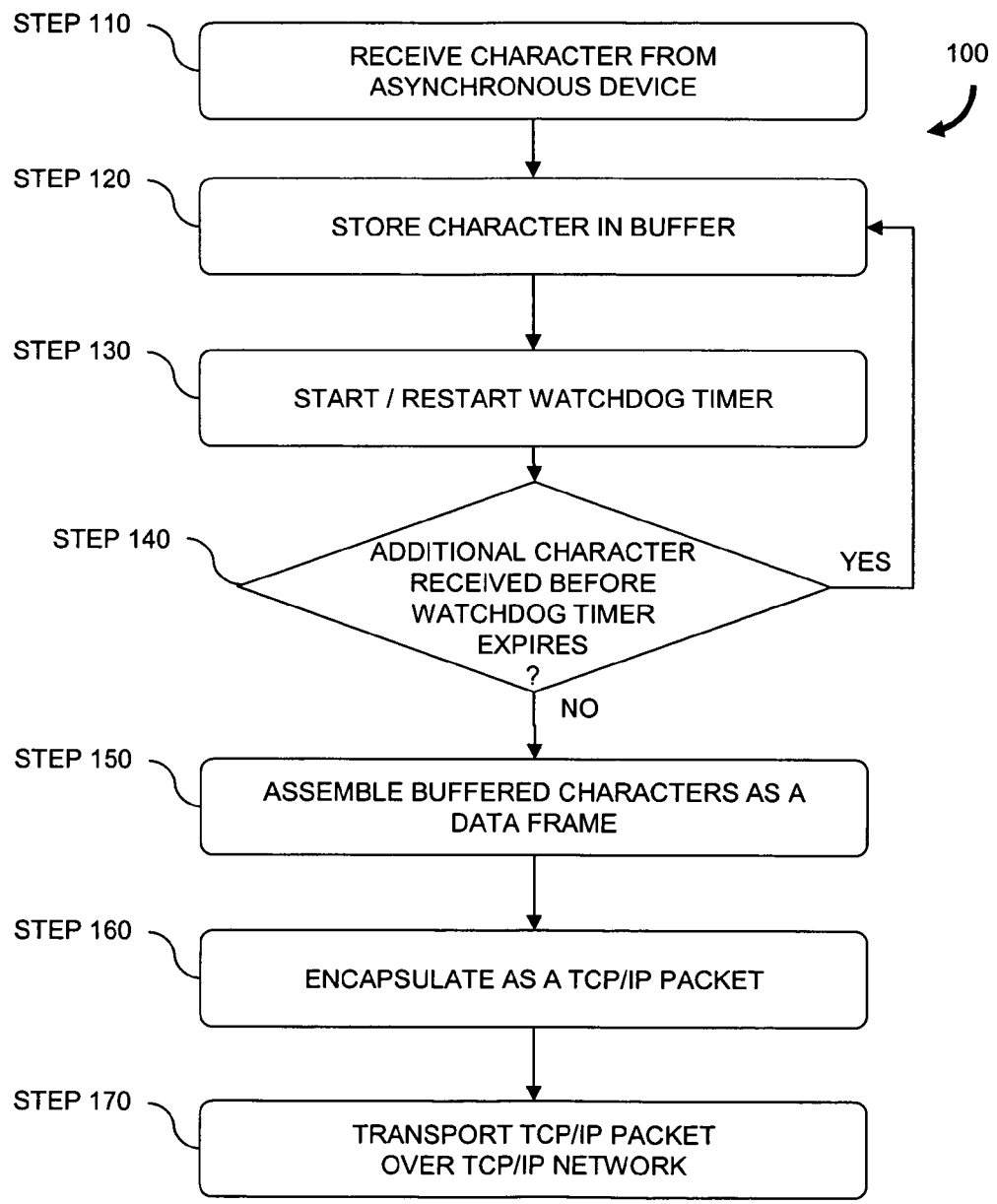
FIG. 4 is a flowchart representation of an embodiment of a method for generating an asynchronous data frame in accordance with the invention.

FIG. 4 is a flowchart representation of an embodiment of a method for generating an asynchronous data frame in accordance with the invention. Referring to FIGS. 1 and 4, a character generated by the client 14 is received (step 110) by the local AOT device 26'. The received character is temporarily stored (step 120) in a buffer and a watchdog timer is started (step 130). The expiration time of the watchdog timer is set to a predetermined interval as described in more detail below. If the serial device driver interrupt level routine determines (step 140) that the next character, i.e., a subsequent additional character, generated by the client 14 is received at the local AOT device 26' before the watchdog timer expires, the additional character is buffered (step 120) and the watchdog timer is restarted (step 130). The repetition of steps 120 and 130 continues as long as additional characters are received before the watchdog timer expires.

If the interrupt level routine determines (step 140) that the watchdog timer expired before another character is received, a timer expiration function is invoked to cause all the characters in the buffer to be assembled (step 150) as a data frame. The data frame is passed to a TCP task for encapsulation (step 160) as a TCP packet. Encapsulation includes appending an AOT packet header to the data frame. The packet is then transmitted (step 170) over the TCP/IP network 18 to the remote AOT device 26" and host 22. In a further embodiment, each TCP received by the remote AOT device 26" is decapsulated, i.e., disassembled, by removing the AOT header. The characters from the asynchronous data frame are then forwarded to the host 22.

The predetermined interval for the watchdog timer is selected to preferably be several times the typical idle time between consecutively received characters belonging to the same data frame. Although the idle time between characters can vary, the expiration time is chosen so that if no additional character is received before expiration of the watchdog timer, a complete frame can be assumed to have been received. Stated otherwise, the longest idle time separating consecutive characters is not sufficient to trigger premature assembly of the buffered data into a frame. The selection of the expiration time is also bounded by a maximum time to prevent unintentional combination of data frames. If the expiration time is set to too large a value, characters that should be assembled in a subsequent data frame are received before expiration of the watchdog timer and included in the current data frame.

The number of system ticks used to determine an end of frame is based on the asynchronous line speed, the total number of bits per character including start bits and stop bits (and parity bits, if any), and a typical number of characters per frame. In one example, a system utilizing a 60 Hz system clock has a corresponding tick of 16.6 ms. In this example, the asynchronous line speed is 19,200 baud, the total number of bits per character is 12 and the typical frame size is 80 characters. Based on these values, the time to transmit a typical frame is 50 ms and the expiration of the watchdog timer can be set, for example, to a value of three ticks. The actual value used can vary according to characteristics of the client 14.

In some applications, the number of characters to be included in a data frame can vary significantly. Accordingly, the buffer size is selected to accommodate the largest number of characters anticipated for a single frame.

Figure 5:
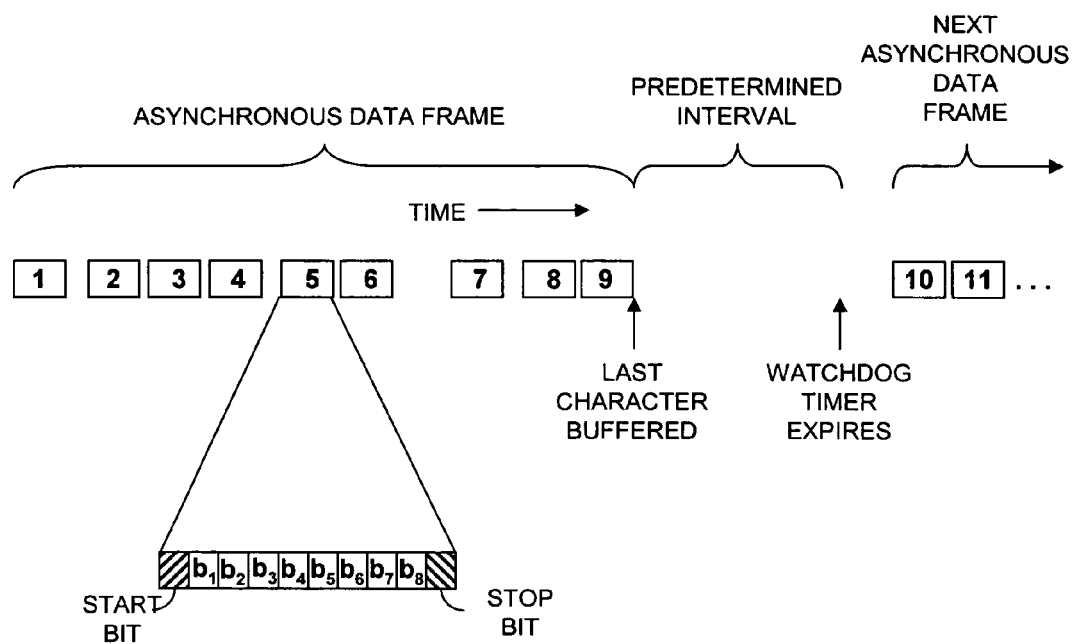
FIG. 5 illustrates generation of an asynchronous data frame according to an embodiment of a method of the invention.

FIG. 5 shows an example of an asynchronous data frame generated according to an embodiment of a method of the invention. A consecutive set of nine characters belonging to a single data frame are depicted as boxes labeled "1" to "9". The fifth character "5" is expanded to show a 10-bit character format common to all of the characters which includes a start bit, eight data bits and a stop bit. The last two characters labeled "10" and "11" belong to a subsequent asynchronous frame. Although the predetermined interval is depicted as a shorter time than that required for transmission of the nine character frame, it should be recognized that the predetermined interval can be substantially greater than the transmission time, especially if the length of the data frame is substantially smaller than a typical data frame.

The idle time between consecutively received characters varies substantially. For example, there is a large idle time between the sixth and seventh characters and only a brief idle time between the eighth and ninth characters. The greatest idle time occurs between the last character ("9") in the first asynchronous data frame and the first character ("10") in the second data frame. In this example, the predetermined interval is shown from the end of the last buffered character ("9") for the first data frame and the time when the watchdog timer expires. This predetermined interval is substantially longer than the largest delay between consecutive characters in the first data frame yet is smaller that the idle time between the data frames.

If the predetermined interval is set too small, it is possible that not all of the characters intended for a single data frame will be included in the frame. For example, if the predetermined interval is less than the delay between the sixth and seventh characters, the seventh, eighth and ninth characters will be assembled as a separate data frame. Conversely, if the predetermined interval is set too large, characters intended for a subsequent data frame can be erroneously included in the prior frame. For example, if the predetermined interval is greater than the delay between the ninth and tenth characters, some of the characters in the subsequent data frame (i.e., at least the tenth and eleventh characters) will be included in the first data frame.

While the invention has been shown and described with reference to specific embodiments, it should be understood by those skilled in the art that various changes in form and detail may be made therein without departing from the spirit and scope of the invention.

What is claimed is:

1. A method for generating an asynchronous data frame for data transmitted from an asynchronous device, the method comprising:
    buffering a character received from an asynchronous device;
    for at least one additional character, buffering the additional character if the additional character is received from the asynchronous device before the expiration of a predetermined interval measured from a time when a last buffered character was received, the predetermined interval being greater than a typical idle time between consecutively received characters and being determined so that the buffered characters comprise a complete set of data for a data frame transmitted from the asynchronous device, wherein said predetermined interval comprises a value based on asynchronous line speed, total number of bits per character, and number of characters per frame; and
    assembling the one or more buffered characters as the data frame after the expiration of the predetermined interval if no additional character is received from the asynchronous device before the expiration of the predetermined interval; generating an encapsulated TCP packet comprising the data frame; transmitting the encapsulated TCP packet to a remote device across a TCP/IP network.

2. The method of claim 1 further comprising disassembling the encapsulated TCP packet into the one or more buffered characters.

3. The method of claim 2 further comprising transmitting the one or more buffered characters of the encapsulated TCP packet to another asynchronous device.

4. A system for generating an asynchronous data frame for data transmitted from an asynchronous device, comprising:
    a device driver interrupt module to indicate receipt of a character from an asynchronous device;
    a watchdog timer configured to generate an indication at the expiration of a predetermined interval that is greater than a typical idle time between consecutively received characters, the predetermined interval being determined to indicate when one or more characters received from the asynchronous device comprise a set of data for a data frame transmitted from the asynchronous device, the watchdog timer being reset when the device driver interrupt module indicates that a character is received, wherein said predetermined interval comprises a value based on asynchronous line speed, total number of bits per character, and number of characters per frame;
    a buffer to store a plurality of characters received from the asynchronous device; and
    a frame assembly module generating the data frame comprising the received characters stored in the buffer when the watchdog timer indicates expiration of the predetermined interval; a TCP/IP module to encapsulate the data frame as a TCP packet.

5. The system of claim 4 wherein the device driver interrupt module, watchdog timer, buffer and frame assembly module are components of a network router.

6. A system for generating an asynchronous data frame for data transmitted from an asynchronous device, comprising:
    means for buffering a character received from an asynchronous device;
    means, for each of at least one additional character, for buffering the additional character if the additional character is received from the asynchronous device before the expiration of a predetermined interval measured from a time when a last buffered character was received, the predetermined interval being greater than a typical idle time between consecutively received characters and being determined so that the buffered characters comprise a complete set of data for a data frame transmitted from asynchronous device, wherein said predetermined interval comprises a value based on synchronous line speed, total number of bits per character, and number of characters per frame; and
    means for assembling the one or more buffered characters as the data frame after the expiration of the predetermined interval if no additional character is received from the asynchronous device before the expiration of the predetermined interval; means for generating an encapsulated TCP packet comprising the data frame; means for transmitting the encapsulated TCP packet to a remote device across a TCP/IP network.

7. The system of claim 6 further comprising means for disassembling the encapsulated TCP packet into the one or more buffered characters.

8. The method of claim 1 wherein said total number of bits per character includes start bits, stop bits and parity bits.

9. The system of claim 4 wherein said total number of bits per character includes start bits, stop bits and parity bits.

10. The system of claim 6 wherein said total number of bits per character includes start bits, stop bits and parity bits.

* * * * *